United States Patent
Marin-Martinod et al.

(10) Patent No.: US 6,334,276 B1
(45) Date of Patent: Jan. 1, 2002

(54) ACTUATOR FOR OPERATING AN ACCESS DOOR AND ACCESS DOOR COMPRISING SAME

(75) Inventors: Thierry Marin-Martinod, Nesles-la-Valleê; Marc Quenerch Du, Bruyēres sur Oise, both of (FR)

(73) Assignee: Labinal (FR)

( * ) Notice: Subject to any disclaimer, the term of this patent is extended or adjusted under 35 U.S.C. 154(b) by 0 days.

(21) Appl. No.: 09/414,086

(22) Filed: Oct. 7, 1999

(30) Foreign Application Priority Data

Oct. 9, 1999 (FR) .......................................... 98 12698

(51) Int. Cl.$^7$ ............................................... E05F 15/00
(52) U.S. Cl. ........................... 49/139; 49/341; 74/89.26
(58) Field of Search ........................... 49/139, 140, 339, 49/340, 341, 333, 334, 335; 74/89.26

(56) References Cited

U.S. PATENT DOCUMENTS

| | | | |
|---|---|---|---|
| 4,179,944 A | * | 12/1979 | Conner ..................... 74/89.26 |
| 4,497,462 A | | 2/1985 | Hamatani |
| 5,644,869 A | | 7/1997 | Buchanan, Jr. |
| 6,055,776 A | * | 5/2000 | Dettling et al. ............... 49/341 |

FOREIGN PATENT DOCUMENTS

| | | |
|---|---|---|
| DE | 197 02 084 | 2/1998 |
| WO | WO 98/17528 | 4/1998 |

* cited by examiner

*Primary Examiner*—Jerry Redman
(74) *Attorney, Agent, or Firm*—Larson & Taylor, PLC

(57) ABSTRACT

The invention relates to an actuator for operating an access door on an aeroplane, comprising a body (18) fitted with a motor member (20) and with a drive member (24) that is movable relative to the body (18) under the action of the motor member (20). The motor member (20) is an electric motor, and the mechanical means (22) of movement transmission are mounted inside the body (18) between the electric motor (20) and the drive member (24) to drive the said drive member (24) from the electric motor (20). The transmission means (22) comprise means (26) of mechanical disengagement of the electric motor (20) from the drive member (24), which, after disengagement, allow the drive member (24) to be moved independently of the electric motor (20).

8 Claims, 3 Drawing Sheets

ACTUATOR FOR OPERATING AN ACCESS DOOR AND ACCESS DOOR COMPRISING SAME

BACKGROUND OF THE INVENTION

The present invention relates to an actuator for operating an access door on an aeroplane, of the type comprising a body fitted with a motor member and with a drive member that is movable relative to the body under the action of the motor member. It also relates to a motorized access door on an aeroplane.

In present-day aeroplanes, access doors to the luggage compartment, or the passenger access doors to the interior of the cabin are operated by hydraulic actuators which move the closing panels between a position in which the passage is closed off and a withdrawn position in which the passage is opened.

In the remainder of the description the term "door" is used to indicate any door or flap or other movable member for closing a passage, such as the doors giving access to the propulsion components of an aeroplane.

The actuators currently used for this application are hydraulic actuators which work by means of a ram powered by a hydraulic fluid under pressure.

With a hydraulic actuator, when the closing panel is in its closed position, the supply of hydraulic fluid to the actuator is cut off. The ram built into the hydraulic actuator now exerts only a very small load, so that the closing panel can, even in the absence of power, or in the event of serious accidents on the aeroplane, be shifted manually by the crew or rescue teams, without the hydraulic actuator's locking the panel and preventing it from being moved.

Of course, in order to prevent any unintentional opening of the doors when the aeroplane is in flight, additional locking means are provided to prevent movement of the closing panel.

In addition, the actuator must not introduce any stress into the aeroplane structure once the door is closed. For this purpose the hydraulic control circuit of the hydraulic actuator is opened to cause a pressure drop in the actuator.

Hydraulic actuators perform satisfactorily. However, they require a source of pressurized hydraulic fluid and pipework to convey the fluid to each actuator. The network of pipes increases the complexity of the aeroplane.

SUMMARY OF THE INVENTION

It is an object of the invention to provide an alternative solution to hydraulic actuators for controlling the access doors of an aeroplane, in which the load exerted by the actuator is small when the actuator stops.

To this end the subject of the invention is an actuator for operating an access door on an aeroplane of the aforementioned type, characterized in that the motor member is an electric motor, and in that mechanical means of movement transmission are mounted inside the body between the electric motor and the drive member to drive the said drive member from the electric motor, which transmission means comprise means of mechanical disengagement of the electric motor from the drive member, which, after disengagement, allow the drive member to be moved independently of the electric motor.

In certain particular embodiments, the actuator comprises one or more of the following characteristics:

the means of disengagement comprise a positive clutch and means of operating the positive clutch to move it between an engaged position and a disengaged position;

the complementary parts of the positive clutch are carried in one case on a pinion of the transmission means, and in the other case on a transmission shaft along which the pinion can slide between the engaged position and the disengaged position, which pinion is free to rotate on the said shaft when not engaged;

the said positive-clutch operating means comprise an electromagnet;

it comprises means for detecting when the door is closed, and the means of disengagement are such as to mechanically disengage the electric motor from the drive member (24) when it is detected that the door is closed;

the said detection means comprise a sensor mounted on the body to detect an extreme position of the drive member; and the said transmission means comprise a screw and nut arrangement for the translational drive of the said drive member relative to the body from the rotary movement of the electric motor.

The invention also relates to a motorized access door on an aeroplane, characterized in that it comprises a closing panel that can be moved relative to the structure of the aeroplane, between a position in which it closes an opening, and a position of disengagement from this opening, and an actuator as described above for moving the said closing panel, the door also comprising means for activating the actuator disengaging means when the closing panel is in the closed position.

In certain particular embodiments, the access door comprises one or more of the following characteristics:

it comprises means for locking the closing panel in the closed position.

A clearer understanding of the invention will be gained from reading the following description given purely by way of an example and with reference to the accompanying drawings in which:

DETAILED DESCRIPTION OF THE PREFERRED EMBODIMENT

Figure 1:
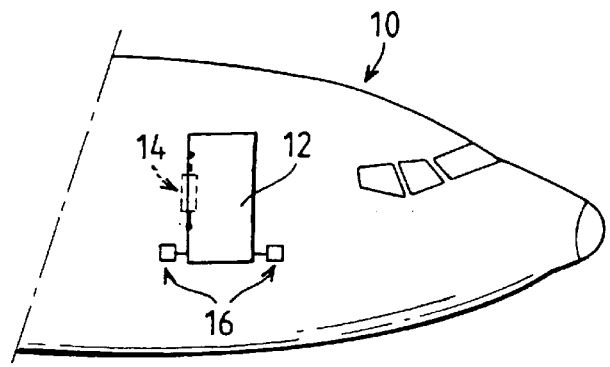
FIGS. 1 and 2 are perspective views of the front end of an aeroplane in which the cabin access door is in the closed and open positions, respectively.
Figure 2:
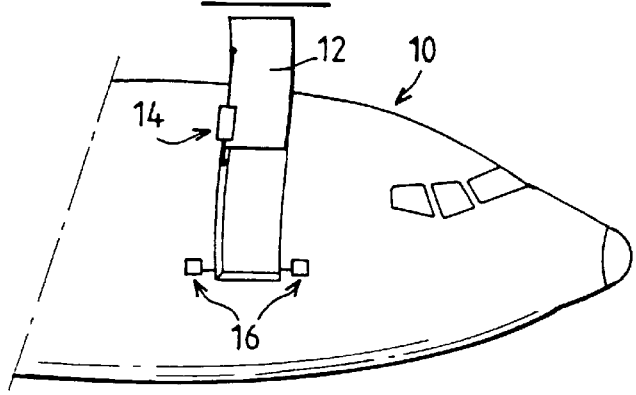
Figure 4:
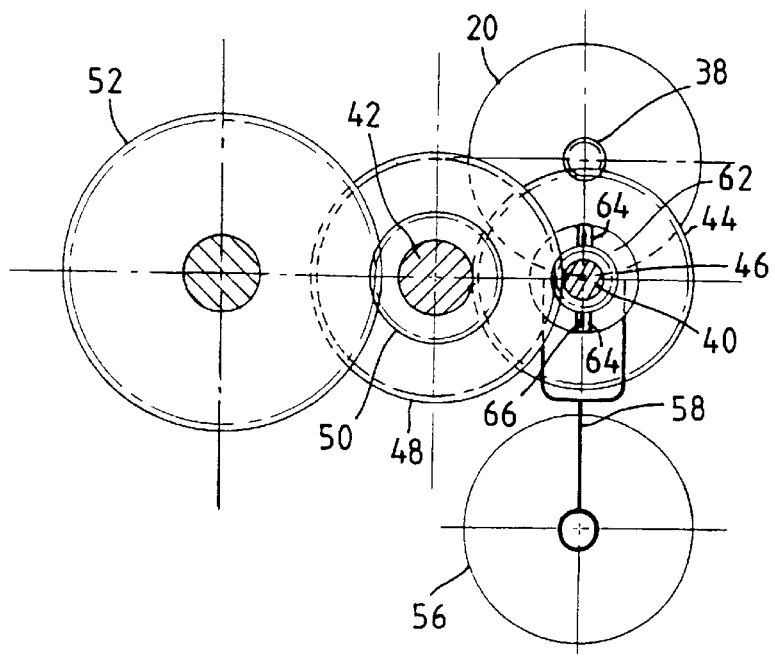
FIG. 4 is a schematic view in section of the actuator shown in FIG. 3 taken on plane IV—IV.

FIG. 1 shows the front end of the cabin 10 of an aeroplane. In its side wall is a door 12 for closing a passage giving access to the cabin. The door 12 is hinged at the top about hinges with a horizontal axis. It is movable between a position in which it closes off the passage as shown in FIG. 1 and an open position shown in FIG. 2.

The door 12 is controlled by an actuator 14 according to the invention. The actuator 14 is located down the side of the door 12. One of its ends is hinged to the structure of the aeroplane and the other end is hinged to a lateral edge of the door 12.

There are also means 16 for locking the door 12 to secure the door in its closed position.

Figure 3:
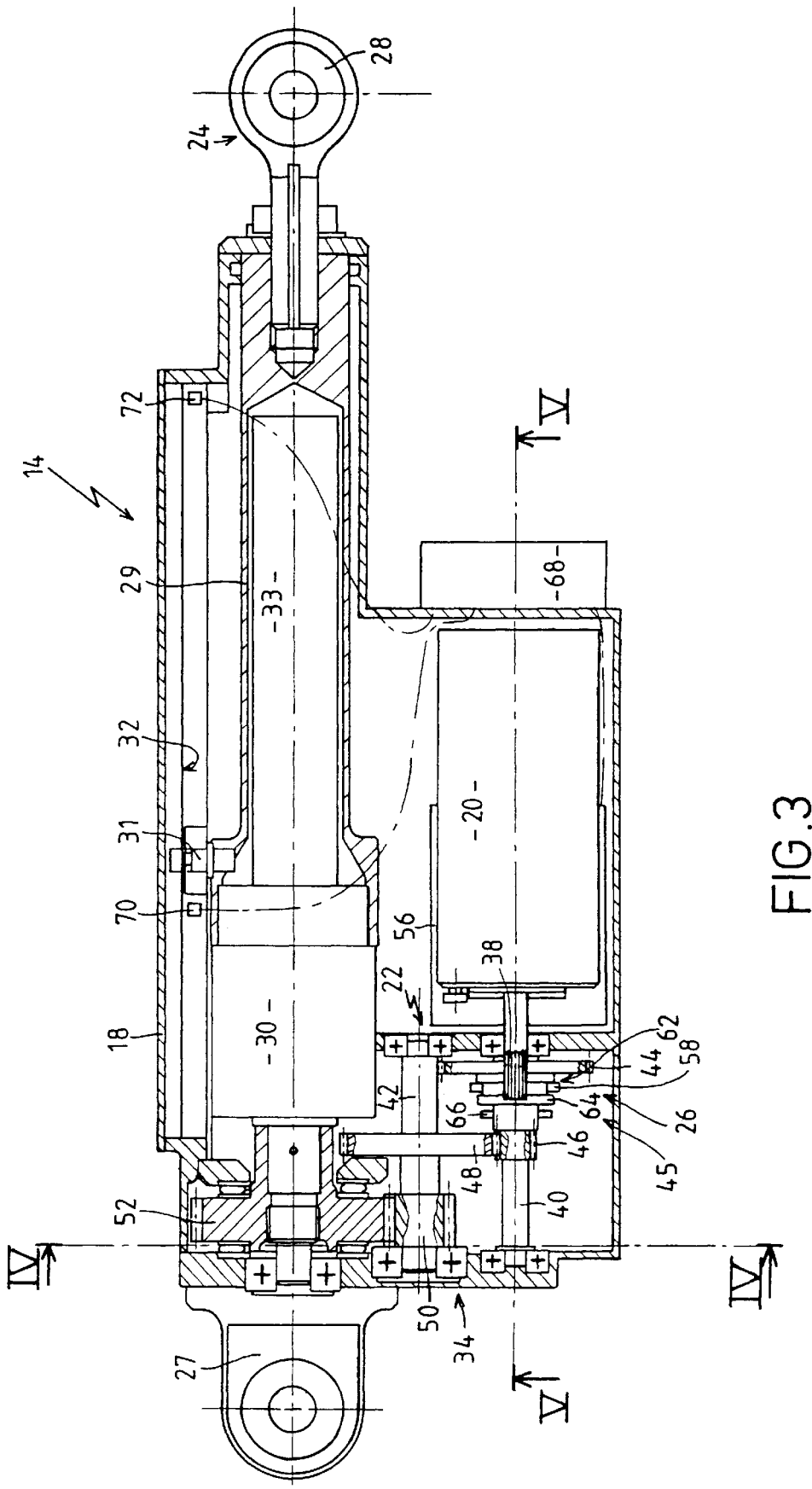
FIG. 3 is a schematic view in longitudinal section of an actuator according to the invention.

The actuator 14 according to the invention is shown in FIG. 3. It comprises an elongate housing 18 forming a body that contains a motor member 20 consisting of an electric motor. It also comprises transmission means 22 to take the drive from the electric motor 20 to a drive member 24 which is movable relative to the body 18. According to the invention the transmission means 22 comprise means 26 of mechanical disengagement of the electric motor 20 from the drive member 24.

At one end of the body 18 is a clevis 27 for its hinged connection to the aeroplane structure. The drive member 24 has an opening 28 at its end for its hinged attachment to the edge of the door 12.

In the embodiment illustrated, the drive member 24 can be moved translationally relative to the body 18. For this purpose it is carried at one end of a tube 29, on whose other end a nut 30 is axially mounted. A tooth 31 extending radially from the tube 29 slides in a straight rail 32 fixed to the body 18. The tube 29 is thus unable to rotate relative to the body 18 inside which it is able to move translationally. The nut 30 is screwed onto a threaded rod 33 turned by the motor 20 via a train 34 of pinions forming a speed reducer.

The screw 30 and the threaded rod 33 thus constitute a screw-and-nut system which converts a rotary movement produced by the motor 20 into a translational movement of the drive member 24.

After an output shaft 38 from the motor, the reducer 34 comprises two intermediate shafts 40, 42, both extending parallel to the threaded rod 33. The intermediate shafts 40, 42 rotate in bearings mounted in the body 18 of the actuator.

The first shaft 40 is smooth and carries a sliding pinion 44 meshing with the output shaft 38. The latter is splined for the greater part of its length. The shaft 40 and the pinion 44 have complementary projecting and recessed profiles by which they can engage so as to be coupled in rotation. In the disengaged position the pinion 44 is free to rotate about the shaft 40. The positive clutch, marked 45, will be described in greater detail later in the description.

The shaft 40 also carries a pinion 46 with a smaller diameter than the pinion 44. The pinion 46 is coupled in rotation to the shaft 40. It meshes with a larger pinion 48 coupled to the second shaft 42. The latter also has a second pinion 50 with a smaller diameter than the pinion 48. The latter meshes with a larger-diameter pinion 52 mounted axially on the end of the threaded rod 33.

The means 26 of disengagement comprise, besides the positive clutch 45, means 54 for the axial movement of the sliding pinion 44. These means comprise an electromagnet 56 used to move a fork 58 whose two arms are engaged in an annular groove 60 running around an extension 62 of the hub of the pinion 44. The extension 62 is located forward of the ring gear of the pinion 44.

The extension 62 comprises, on its front face, two radial notches 64 designed for engagement with the two projecting ends of a pin 66 which passes axially through the shaft 40. The pin 66 and the notches 64 provide engagement between the movable pinion 44 and the shaft 40 and constitute the positive clutch 45.

Figure 5:
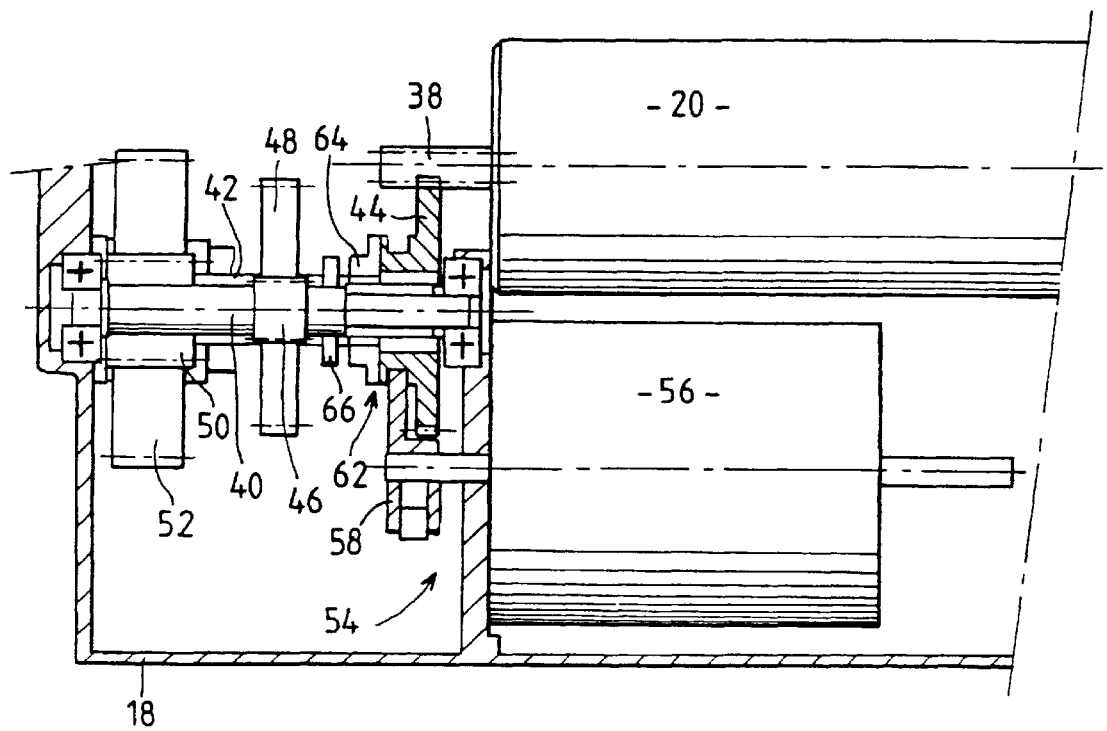
FIGS. 5 and 6 are partial sectional views taken on plane V—V of the actuator with its means of power transmission, in the disengaged and engaged positions, respectively.
Figure 6:
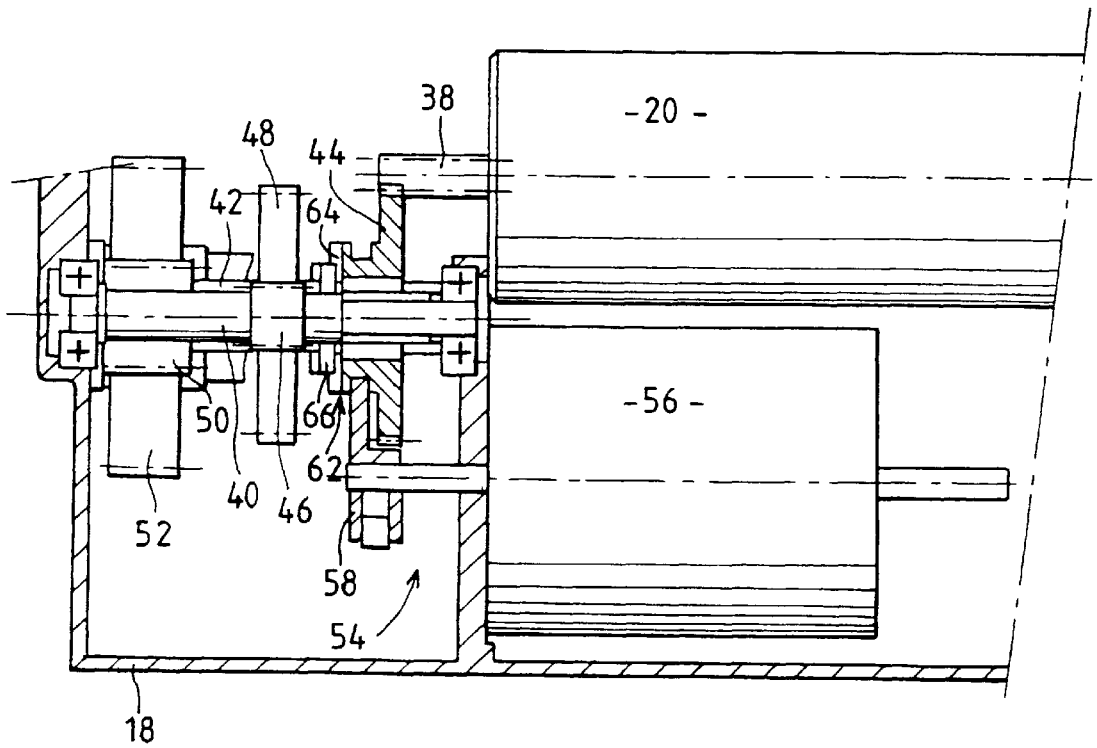

It will be seen that, under the control of the electromagnet 56, the pinion 44 can be moved along the shaft 40 by the action of the fork 58 between a position of engagement with the pin 66, as shown in FIG. 6, in which the shaft 40 and the pinion 44 are coupled in rotation, and a disengaged position, shown in FIG. 5, in which the shaft 40 can turn without driving the pinion 44.

The electromagnet is connected, for the purpose of its control, to a central information processing unit 68 which in turn is connected to two end-of-travel sensors 70, 72 located at either end of the rail 32. These sensors are designed to be acted upon by the tooth 31 so that the extreme positions of the drive member 24 can be detected.

The central information processing unit 68 is designed to send a signal to disconnect the disengaging means 26 when the end-of-travel stop 70 detects that the actuator is in its retracted position, which corresponds to the closed position of the door of the aeroplane.

When an order to open the door is received, the central control unit 68 controls the electromagnet 56 to re-engage the pinion 44 of the shaft 40.

The end-of-travel detector 72 is used to cut off the supply to the motor 20 when the actuator is fully deployed. However, it does not control the disengagement of the positive clutch 45.

Thus, with such an actuator, following complete closure of the door of the aeroplane, the motor 20 is mechanically disengaged from the drive member 24. Consequently, once the locking means 16 have been unlocked, the door 12 can be moved manually, its movement bringing about movement of the moving parts of the reducer 24 without however driving the motor shaft 38.

Although electrically powered, such an actuator offers no opposition to the manipulation of the member which it controls. It can therefore be used in applications in which safety constraints require the actuator not to prevent the controlled member from being moved.

Furthermore, after the door is closed, the actuator introduces no stresses into the structure of the aeroplane.

What is claimed is:

1. An actuator for use in operating an access door on an airplane, said actuator comprising:
   a body having a motor member and having a drive member which is movable relative to the body under the action of the motor member, the motor member being an electric motor;
   transmission means mounted inside the body operatively connected between the electric motor and the drive member to drive said drive member from the electric motor, said transmission means comprising actuator disengaging means for mechanically disengaging the electric motor from the drive member to allow the drive member to be moved independently of the electric motor, and including detection means for detecting when the access door is in a closed position, the disengaging means being such as to mechanically disengage the electric motor from the drive member when the detector means detects the access door in the closed position.

2. An actuator according to claim 1, wherein the disengaging means comprises a positive clutch and including operating means for operating the positive clutch to move it between an engaged position and a disengaged position.

3. An actuator according to claim 2, wherein complementary parts of the positive clutch are carried in one position on a pinion of the transmission means and in the other position on a transmission shaft along which the pinion can slide between the engaged position and the disengaged position, which the pinion is free to rotate on said shaft when not engaged.

4. An actuator according to claim 2, wherein the operating means comprises an electromagnet.

5. An actuator according to claim 1, wherein the detection means comprises a sensor mounted on the body to detect an extreme position of the drive member.

6. An actuator according to claim 1, wherein the transmission means comprises a screw and nut arrangement for translational drive of the drive member relative to the body from rotary movement of the electric motor.

7. A motorized access door on an airplane having a structure with an opening, said access door comprising:

a closing panel which can be moved relative to the opening, between a position in which the closing panel closes the opening and a position of disengagement from this opening;

an actuator for moving the closing panel comprising:

a body having a motor member and having a drive member which is movable relative to the body under the action of the motor member, the motor member being an electric motor;

transmission means mounted inside the body operatively connected between the electric motor and the drive member to drive said drive member from the electric motor, said transmission means comprising actuator disengaging means for mechanically disengaging the electric motor from the drive member to allow the drive member to be moved independently of the electric motor, and including detection means for detecting when said closing panel is in a closed position, the disengaging means being such as to mechanically disengage the electric motor from the drive member when the detector means detects said closing panel in the closed position; and means for activating the actuator disengaging means when the closing panel is in the closed position.

8. A motorized access door according to claim 7, further comprising means for locking the closing panel in the closed position.

* * * * *

UNITED STATES PATENT AND TRADEMARK OFFICE
CERTIFICATE OF CORRECTION

PATENT NO.     : 6,334,276 B1
DATED          : January 1, 2002
INVENTOR(S)    : Marin-Martinod et al.

It is certified that error appears in the above-identified patent and that said Letters Patent is hereby corrected as shown below:

<u>Title page</u>,
Item [30], Foreign Application Priority Data, change "October 9, 1999 (FR)………..98 12698" to -- October 9, 1998 (FR)………..98 12698 --.

Signed and Sealed this

Fourth Day of June, 2002

Attest:

JAMES E. ROGAN
Attesting Officer        Director of the United States Patent and Trademark Office